United States Patent [19]

Waldner

[11] 3,794,939

[45] Feb. 26, 1974

[54] NONLINEAR SURFACE WAVE CONVOLUTION FILTER

[75] Inventor: Michael Waldner, Woodland Hills, Calif.

[73] Assignee: Hughes Aircraft Company, Culver City, Calif.

[22] Filed: Apr. 2, 1973

[21] Appl. No.: 347,019

[52] U.S. Cl. .................................. 333/72, 333/30 R

[51] Int. Cl. ........ H03h 7/02, H03h 7/14, H03h 9/32

[58] Field of Search ...... 330/72, 30 R; 310/8.1, 8.2, 310/9.6, 9.8, 9.7

[56] References Cited

OTHER PUBLICATIONS

Svaasand – 'Applied Physics Letter' Vol. 15, No. 9, Nov. 1969; pp. 300–302.

*Primary Examiner*—Rudolph V. Rolinec
*Assistant Examiner*—Marvin Nussbaum
*Attorney, Agent, or Firm*—W. H. MacAllister; J. Holtrichter, Jr.

[57] ABSTRACT

Nonlinear surface wave interaction devices having a pair of input electro-acoustic transducers disposed on a piezoelectric substrate with a coupling plate disposed on the substrate and intercepting the intersecting acoustic surface wave signals generated by the two transducers are disclosed wherein one of the propagating input signals, upon overlapping and crossing the other input signal traveling in essentially an opposite direction, undergoes a time reversal with respect to the other signal to produce at the coupling plate an output signal that is the convolution of the two input functions. In order to reduce spurious signals in the output of these devices, which are caused by a traveling second harmonic signal, the edges of the coupling plate upon which the input signals are incident are angled to average the charge carried by the traveling second harmonic over a number of wave lengths.

8 Claims, 5 Drawing Figures

NONLINEAR SURFACE WAVE CONVOLUTION FILTER

The invention herein described was made in the sourse of or under a contract with the United States Air Force.

BACKGROUND OF THE INVENTION

The background of the invention will be set forth in two parts.

FIELD OF THE INVENTION

This invention relates to acoustic surface wave devices and more particularly to nonlinear surface wave convolution filters having means for reducing spurious signals caused by traveling second harmonics of the input signals.

DESCRIPTION OF THE PRIOR ART

With the advancement of modern technology, there has arisen the problem of an ever-increasing requirement for efficient acquisition and processing of immense quantities of data in very short periods of time. In the communications field, for example, these problems concern the filtering, amplifying and storing or received signals and also the processing and recognition of signals of a desired and known form.

For many years there has been an interest in elastic wave propagation devices, developed in what is generally known as microwave acoustic technology, for solving the aforementioned problems. In the earlier part of this work, the focus of attention of most workers in the field was concentrated on the phenomenon of both elastic waves, at acoustic or sound frequencies, propagating totally inside solids. For example, devices were constructed which employed both elastic waves for the storage or delay of signals. In these early delay lines, electrical signals were converted to elastic waves, usually by piezoelectric crystals, which propagated in the elastic solid and then reconverted to electrical form by a second transducer.

The advantage of the use of sound frequency energy for these applications in solids is related to the excellent transmission characteristics of acoustic media and to the relatively low propagation velocity of approximately five orders of magnitude less than that of the speed of light or that of electromagnetic waves. As an example, an elastic wave resonator operating at a given frequency is typically 100,000 times smaller than an electromagnetic wave transducer for the same frequency, and the higher Q of acoustic media allows delay times of about 100 times that possible with low-loss electromagnetic waves.

Most of the effort until recently has been associated with realizing both acoustic wave devices such as delay lines and amplifiers consisting of a crystalline block with opposite flat and parallel surfaces to which opposing piezoelectric transducers are attached. An input transducer converts an electrical signal to acoustic energy which is beamed through the medium to an output transducer. However, in most typical bulk devices it is almost impossible to tap, switch, vary the delay, vary the amplitude, or otherwise manipulate the acoustic energy during transit through the solid. Consequently, the use of these devices has been generally limited to passive devices and non-dispersive delay lines.

This undesired restriction of access to the elastic wave has led to investigations of the elastic waves that can be propagated along the boundary surfaces of solids. This phenomenon was first described by Lord Rayleigh in an article entitled, "On Waves Propagated Along the Plane Surface of an Elastic Solid," *Proceedings*, London Mathematics Society, Vol. 17, pp 4–11, Nov. 1885. Devices utilizing such surface waves have the advantage of allowing the easy access at all times to the propagating acoustic energy, to sample it, and to modify and interact with it. It should therefore be evident that this permits the realization of a wider range of devices than with bulk waves.

Surface waves, in contrast to bulk waves, are localized to the surface of solids. The typical particle motion is elliptical, and the amplitude decays exponentially into the body of the medium. As to phase velocity, the speed of a surface wave is approximately 90 percent that of the bulk shear wave in most media. Probably the medium most widely used at the present time is one of several piezoelectric materials.

The basic building block of all surface wave devices is the acoustic surface wave delay line which includes spaced transducers usually disposed on a piezoelectric substrate. The transducers now in general use are the interdigital type consisting of a series of conductive electrodes that form a pattern which is disposed on a substrate surface. The transducers are 2-terminal devices having two separate arrays of metal strips resembling interleaved fingers and convert incoming electrical signals into a time-dependent space-varying electric field pattern which, in turn, generates an acoustic surface wave directly on the substrate through the electrostatic action of piezoelectric crystals.

In the development of acoustic surface wave devices, it was found that nonlinear interactions of surface waves in acoustic media can lead to the implementation of a number of desirable processing functions in such fields as radar pulse compression, radar target signature analysis, and in microscan receiver applications.

In 1969 an article in Applied Physics Letters, Vol. 15, page 300, by L. O. Svaasand, entitled "Interaction Between Elastic Waves in Piezoelectric Materials" described an acoustic surface wave device having two spaced input transducers and a coupling plate therebetween. Input signals at a frequency $\omega$ were introduced to both transducers and an output signal was observed at the coupling plate output terminal at a frequency of $2\omega$. This output signal is a consequence of the nonlinearity of the acoustic medium in which a polarization is produced by the acoustic surface waves near the surface, which is determined by the square of the elastic strain. If, at a given place under the coupling plate, strains produced by the two input signals are overlapping, a polarization proportional to the product of the strains is produced. It is this multiplication due to the strain that produces frequency doubling. Moreover, since the input signals travel under the plate and the signals introduced over a period of time are present under the plate, the coupling plate also performs an integration overtime.

Similar devices were described by M. Luukklala and G. S. Kino in an article entitled "Convolution and Time Inversion Using Parametric Interactions of Acoustic Surface Waves," published in Applied Physics Letters, Vol. 18, page 393 (1971).

In operation of devices of the coupling plate type described in the referenced articles, it has been found that undesirable spurious signals were generated. The cause of these spurious signals has now been determined and a novel technique involving the geometrical configuration of the coupling plate has been devised in order to reduce the magnitude of the spurious output without detrimentally affecting the function of the device or its desired output signal.

SUMMARY OF THE INVENTION

In view of the foregoing factors and conditions characteristic of the prior art, it is a primary object of the present invention to provide an improved nonlinear surface wave convolution filter not subject to the disadvantages enumerated above.

Another object of the present invention is to provide a nonlinear surface wave convolution filter having a coupling plate with a novel geometric configuration that reduces spurious output signals.

Still another object of the present invention is to provide a nonlinear surface wave convolution filter including beam focusing means to direct oppositely propagating acoustic surface wave input signals.

In accordance with an embodiment of the present invention, a nonlinear surface wave convolution filter includes transducer means including a pair of spaced electro-acoustic transducers disposed on a substrate of piezoelectric material capable of propagating and nonlinearly affecting acoustic surface wave energy therein for launching acoustic surface wave signals in the substrate in response to received electrical signals, the acoustic surface wave signals propagating in opposite directions and overlapping each other in a nonlinear interaction region between the transducers. The invention is also provided with coupling means including a coupling plate disposed on the substrate in the nonlinear interaction region for coupling to the interacting propagating signals and providing an output signal that is the convolution of the received electrical signals. The coupling means includes charge averaging means at the ends of the coupling plate upon which the propagating signals are incident for reducing the second harmonic signal component in the output signal.

The ends of the coupling plate may be parallel and angled with respect to a perpendicular to the direction of the propagating signals. Embodiments of the invention may also include wedge-shaped structures disposed between the input transducers and the coupling plate so that the input signals interact in the area of the coupling plate to obtain maximum convolution efficiency.

The features of the present invention which are believed to be novel are set forth with particularity in the appended claims. The present invention, both as to its organization and manner of operation, together with further objects and advantages thereof, may best be understood by making reference to the following description, taken in conjunction with the accompanying drawings, in which like reference characters refer to like elements in the several views.

DESCRIPTION OF THE PREFERRED EMBODIMENTS

Figure 1:
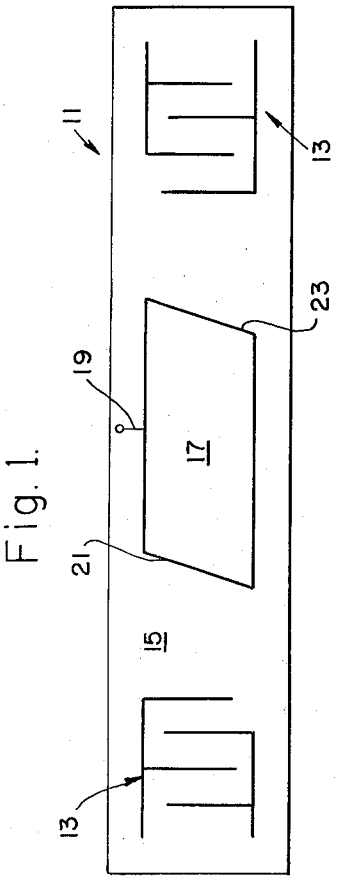
FIG. 1 is a schematic representation of a nonlinear surface wave convolution filter constructed in accordance with one embodiment of the present invention.

Referring now to the drawings and more particularly to FIG. 1, there is shown a nonlinear surface wave convolution filter 11 wherein a pair of spaced interdigitated electro-acoustic transducers 13 are disposed on a substrate 15 of piezoelectric material capable of propagating acoustic surface wave energy. In this embodiment, a conductive coupling plate 17 of aluminum is plated, bonded or otherwise disposed on the substrate 15 between the transducers 13 and in the pathes of acoustic surface wave signals generated by these transducers when the latter are excited by input electrical signals from sources not shown. The coupling plate 17 is provided with an output terminal 19 whereby a convolution output signal may be obtained by coupling to the terminal 19 and a conventional ground plate (not shown) disposed parallel to the coupling plate on the opposite side of the substrate 15. The ground plate may cover the entire lower surface or conform to the configuration of the coupling plate, as is well known in the art.

In operation, acoustic surface waves generated at the two end transducers 13 travel toward the center of the device, eventually start to overlap, cross, and then separate. Because the waves are traveling in different directions, the envelope of one of the signals undergoes a time reversal with respect to the other. As a consequence, the output becomes the convoltion of the two input functions, rather than their correlation.

In the prior art, the coupling plate was provided with ends that were parallel and orthoganal to the direction of propagation of the acoustic surface wave generated by the transducers. In general, they were rectangular in shape. With such a configuration, spurious signals were observed. These signals have been found to correspond in time to the arrival of the acoustic surface wave at the leading and trailing edges of the convolution coupling plate (or plates if the ground plate is considered). As noted previously, these signals correspond to traveling second harmonic signals which cannot be eliminated by filtering the input because they are due to the generation of the second harmonic by the fundamental in the non-linear piezoelectric substrate.

Figure 2:
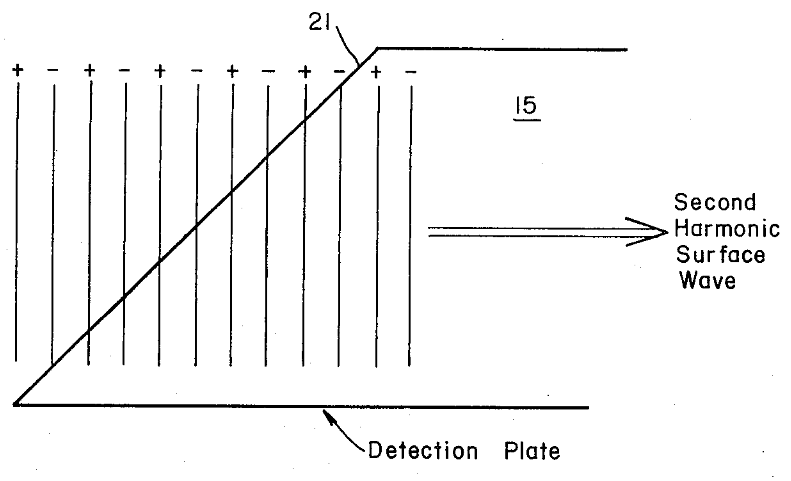
FIG. 2 is a schematic illustration of the averaging effect of the angled ends of the coupling plate in the device of FIG. 1.

It has now been found that the edge of the coupling plate (also known as the convolver plate) acts as a single element pickup for this traveling second harmonic wave. Accordingly, in accordance with the basic feature of the present invention, the opposite edges or ends 21 and 23 of the coupling plate 17 are angled so that there will be an averaging of the charge carried by the traveling second harmonic wave over a number of wave lengths, as shown schematically in FIG. 2.

Where the ends 23 of the coupling plate 17 are not at a relatively great angle and/or where the length of the convolution or coupling plate is relatively short (short transit time), the acoustic surface wave energy generated by the transducer 13 will generally not be refracted by the angled ends to such an extent that would cause a severe misalignment and a consequent reduction of convolution efficiency. However, in accordance with another embodiment of the invention, special compensation structures 31 are bonded to or otherwise disposed on the piezoelectric substrate 33 (similar to substrate 15 in FIG. 1) between two conventional transducers 35 and an elongated convolution plate 37 that has relatively steeply angled ends 39.

As noted previously, the ends of the convolution plate are angled in order to cause an averaging of the charge carried by the traveling second harmonic wave over a number of wave lengths. The greater the number of wave lengths that are averaged, the lesser will be the pickup response by the convolution plate 37, and the lesser will be the spurious signal in the device's output at terminal 41. However, the effective convolution plate area, which is required for efficient convolution efficiency, is measured by the width of the oppositely propagating surface waves under the plate and by the length of their nonlinear interaction under the plate as measured between lines drawn perpendicular to the propagating energy at each end of the plate closest to the center. This is shown graphically in FIG. 3 by dashed lines 43. Thus, the angle of the ends has practical limits, depending upon the desired convolution efficiency, transit time considerations, and the desired overall dimensions of the complete device, for example. The minimum limit would obviously be an angle that eliminated the effective convolution plate area. In this case, tan $\theta$ equals the aperture or beam width divided by the overall length of the convolution or coupling plate. On the other hand, the minimum useful angle with respect to a line transverse to the traveling second harmonic surface wave energy would be, $\theta$ equals the wave length of the second harmonic wave energy divided by the width of the interacting beam energy generated by the transducers as limited by their apertures.

Figure 3:
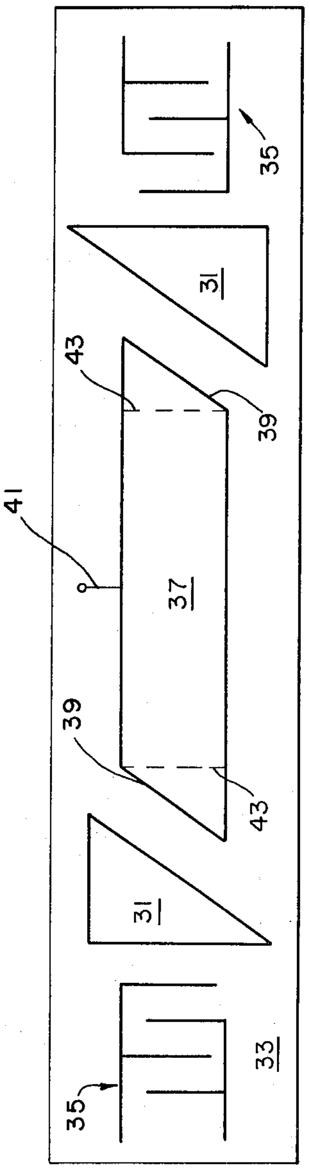
FIG. 3 is a schematic representation of an embodiment of the invention wherein special acoustic beam directing structures are utilized.
Figure 4:
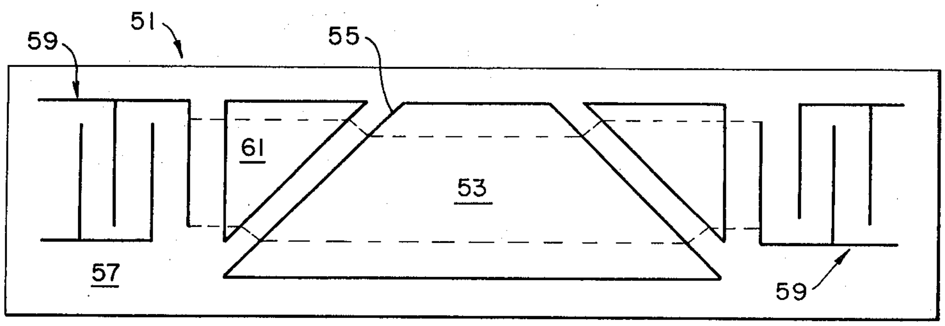
FIG. 4 illustrates an embodiment of the present invention wherein the coupling plate has oppositely sloping ends.

As can be seen from an embodiment 51 shown in FIG. 4, the ends of the convolution plate need not be parallel. Here, a convolution plate 53, with oppositely angled ends 55, is disposed on a substrate of piezoelectric material 57 between a pair of conventional transducers 59. For better convolution efficiency, as provided by a maximum nonlinear interaction of the propagating input signals under the plate 53, a special convolution structure 61 is disposed on the substrate 57 between each plate end 55 and its associated transducer 59. The structures 61 are similar in design and purpose to those identified by reference number 31 in FIG. 3.

As the structures 31 in the embodiment of FIG. 3, the triangular elements 61 compensate for beam refraction caused by the angled ends of the convolution plate. Under the circumstances previously mentioned, without these compensation structures the beam refracts at the entrance to the convolution plate and tends to be deflected out of the straight path between the input transducers. The basic principle in the design of such structures 61 is that of keeping the transit time of acoustic surface wave propagation equal over the entire beam width, by the time the energy reaches the interaction (unangled) area of the convolution plate. Thus, only the transit time characteristic of the structure is of importance and not its overall general appearance, in other words, it need not be triangular. Any material that will cause a change in transit time of the propagating energy without undue distortion, such as aluminum for example, may be utilized.

The convolution plate also need not be of any particular shape. For example, the sides of the plate need not be parallel. In fact, the sides may be of irregular shape so long as the overlapping of the propagating means occurs under the plate, for maximum efficiency. With proper beam direction compensation, the ends of the convolution plate need not be of the same angle, but then the reduction of the spurious signal content will be governed by the minimum angle provided at either end of the convolution plate. It has been observed that either input along can produce the spurious second harmonic signals.

Figure 5:
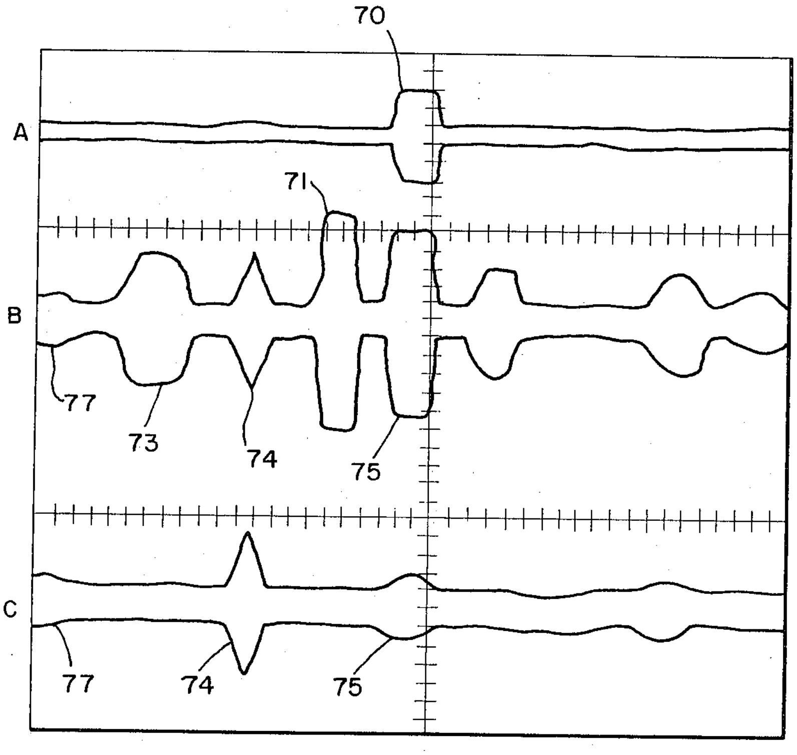
FIG. 5 is a graphical illustration of an oscilloscope presentation comparing an output signal from a nonlinear surface wave convolution filter having a rectangular coupling plate with one having a coupling plate with angled ends.

The distinct advantage of using a convolution or coupling plate with angled ends is graphically illustrated in the oscilloscope presentation of FIG. 5. The upper trace, A, is an input signal 70, and the next lower trace, B, shows the output of a prior art convolution filter utilizing a convolution plate having ends perpendicular to the propagating energy. Note in tract B the relatively large spurious signals 71 and 73 on each side of the desired output signal 74. The responses 75 and 77 shown in the same traces are due to R.F. pickup and can be minimized by conventional shielding. The lower trace, C, dramatically shows the significant reduction of the spurious signal output by the use of a coupling plate with angled ends, as described hereinabove.

The presently preferred piezoelectric substrate material for this application is Y-cut, Z-propagating lithium niobate. Another material which may be useful in certain applications is bismuth germanium oxide. The convolution plate and the beam direction compensating structures may be of conductive materials such as aluminum, for example. Also, some semiconductor materials such as silicon or germanium arsinide may be used, with results well known to those skilled in the art.

Nonlinear surface wave convolution filters of the type herein described may be utilized in a number of applications, including of course, frequency doubling. For example, the device may be used to obtain a variable time delay by coupling an input pulse to one transducer and a narrow pulse of variable timing to the other transducer to produce a delayed pulse that is also narrowed in time at the convolution plate's output. The time delay will depend upon the time difference between the two input signals. However, this operation does not correspond to setting a variable time delay unless the narrow pulse timing is synchronized with the signal pulse.

From the foregoing, it should be evident that the invention constitutes a significant advancement of the art by providing an efficient nonlinear surface wave convolution filter that exhibits a marked reduction of spurious signal content in its output.

It should also be understood that the materials used to fabricate the various embodiments of the invention are not critical and any material exhibiting similar desired characteristics may be substituted for those mentioned. Accordingly, it should be realized that although the present invention has been shown and described with reference to particular embodimetns, various changes and modifications obvious to one skilled in the art to which the invention pertains are deemed to be within the spirit, scope, and contemplation of the invention.

What is claimed is:

1. A nonlinear surface wave convolution filter, comprising:

a substrate of piezoelectric material capable of propagating and nonlinearly affecting acoustic surface wave energy therein;

transducer means including a pair of spaced electro-acoustic transducers disposed on said substrate for launching acoustic surface wave signals in said substrate in response to received electrical signals, said acoustic surface wave signals propagating in opposite directions and overlapping each other in a nonlinear interaction region between said transducers, each of said propagating signals including a traveling second harmonic nonlinear signal component; and coupling means including a coupling plate disposed on said substrate in said nonlinear interaction region for coupling to the interacting propagating signals and providing an output signal that is the convolution of said received electrical signals, said coupling means including charge averaging means at the ends of said coupling plate upon which said propagating signals are incident for reducing said second harmonic nonlinear signal component in said output signal.

2. The filter according to claim 1, wherein said ends of said coupling plate are parallel.

3. The filter according to claim 1, also comprising beam compensation means for compensating for any beam refraction of said propagating signals due to the configuration of said ends of said coupling plate.

4. A nonlinear surface wave convolution filter, comprising:

a substrate of piezoelectric material capable of propagating and nonlinearly affecting acoustic surface wave energy therein;

transducer means including pair of spaced electro-acoustic transducers disposed on said substrate for launching acoustic surface wave signals in said substrate in response to received electrical signals, said acoustic surface wave signals propagating in opposite directions and overlapping each other in a nonlinear interaction region between said transducers, each of said propagating signals including a traveling second harmonic nonlinear signal component; and coupling means including a coupling plate disposed on said substrate in said nonlinear interaction region for coupling to the interacting propagating signals and providing an output signal that is the convolution of said received electrical signals, said coupling plate having ends upon which said propagating signals are incident, said ends being angled with respect to a line perpendicular to the direction of propagation of said propagating signals.

5. The filter according to claim 4, wherein the angle of said ends with respect to said line is $\theta$, $\theta$ being an angle between the limits $\theta = \lambda/A$ and $\tan\theta = a/L$, where $\lambda$ is the wave length of said traveling second harmonic nonlinear signal, a is the width of said propagating signals measured along said line, and where L is the length of said interaction region in the direction of said propagating signals.

6. The filter according to claim 5, wherein said ends are parallel.

7. The filter according to claim 4, wherein said ends lie in intersecting planes.

8. The filter according to claim 4, also comprising beam compensation means for compensating any beam refraction of said propagating signals due to the angled ends of said coupling plate.

* * * * *